United States Patent Office 3,421,838
Patented Jan. 14, 1969

3,421,838
METHOD FOR INHIBITING THE EVAPORATION OF VOLATILE MATERIALS
Richard E. Hellings, Pennsauken, N.J., assignor to Cities Service Oil Company, Bartlesville, Okla., a corporation of Delaware
No Drawing. Filed Jan. 14, 1966, Ser. No. 520,644
U.S. Cl. 21—60.5                               6 Claims
Int. Cl. C10c 3/00

This invention relates to a method of reducing the rate of evaporation of stored petroleum products. It relates particularly to a method for reducing the rate of solvent evaporation from stored petroleum products having a free surface within a storage container.

The petroleum industry has long been plagued with the problem of evaporation of petroleum products which are stored in tanks. Attempts to minimize this loss have resulted in various proposals, none of which have proven entirely satisfactory. The design of the storage tanks, particularly the roofs of the tanks, have been altered in an effort to reduce the evaporation loss.

It has also been proposed previously to employ layers of discrete, finely divided solid particles under certain conditions to act as a barrier to the evolution of vapors on the surface of the liquid. One type of material which has been proposed for use in this manner, comprises spheres of phenolic resin containing nitrogen gas at atmospheric pressure within the spheres. The outer particle size of the spheres being, for example, about 0.0013 inch. Such spheres have been found to be effective in reducing the loss of material by evaporation, but are subject to the disadvantage of contaminating the body of the liquid with the solid particles, as a result of individual particles sinking from the covering layer during the storage period, or of all or part of a layer being withdrawn with the liquid when the liquid is removed from the storage tank. Also, these materials are subject to the disadvantage that they may collapse under elevated pressure and lose their buoyant properties.

It is an object of this invention to provide a permanent, inexpensive and effective method of substantially decreasing or inhibiting the evaporation loss from stored petroleum products.

It is another object of this invention to provide a permanent, inexpensive and effective method of substantially decreasing or inhibiting evaporation loss from petroleum products stored at an elevated temperature.

It is another object of this invention to provide a method for inhibiting evaporation of organic solvents which are added to stored asphaltic materials.

These and other objects, as well as the utility and advantages of the invention, become apparent from the following detailed description.

Preliminary to a detailed discussion of this invention, definition of certain terms would appear to be in order. The term "asphalt" as used in the petroleum industry, applies to the semi-solid or solid residuum left in the stills after the volatile fractions of an asphalt bearing crude oil are removed. The term "asphalt cutback" is applied to an asphaltic material to which an organic solvent has been added. The terms "on-grade" and "off-grade" relate to the specification which the asphalt cutbacks must meet in order to comply with the standards and specifications established by various governmental and private agencies. The term "RC" refers to a rapid curing asphalt cutback. The term "MC" refers to a medium curing asphalt cutback. The term "cement," or alternatively "rubber cement," as understood in the art and as used in this application, refers to rubber-organic solvent mixtures in which the rubber is completely dissolved, or at least is substantially dissolved and the remainder dispersed in the solvent.

Asphalt cutbacks are produced by fluxing an asphaltic base with suitable distillates to comply with requirements established by various official agencies. At the present time in plants using cutback storage facilities, asphalt cutbacks are prepared to meet a particular specification grade by the addition of the required amount of solvent to an asphalt of suitable grade. It is common practice to store asphalt cutbacks at elevated temperatures in order to provide for its delivery at a suitable viscosity for direct use in spraying or mixing. During storage at elevated temperatures the low boiling distillates, as well as the light end fractions initially present in the asphaltic crude are lost, and the cutback goes "off-grade" in a comparatively short time. It is then necessary to add additional solvent to bring it back "on-grade." This procedure involves an added operating cost for manpower as well as make-up solvent. A further cost is sometimes incurred by reprocessing if the asphalt cutback remains in storage for too long a period of time. This is caused by the evaporation of too high a portion of the light ends of the asphaltic material thereby making it impossible to bring the cutback "on-grade" by adding the solvent normally employed.

It has been found that if a suitable vapor barrier material is added to the asphalt cutback storage tanks, the loss of the added solvent is reduced to a minimum and the asphalt cutback can be maintained "on-grade" for extended periods of time, without the need for adding make-up distillates. It has been found that the addition of a rubber cement to the asphalt cutback results in the formation of such a suitable vapor barrier. The advantages obtained by the use of a rubber cement, over the materials of the prior art, are: formation of a flexible barrier which conforms to the level of the cutback; self healing properties when the film barrier is accidently ruptured; the ability of the elastomer (rubber) to rise to the surface even after prolonged periods of mixing at elevated temperatures; the fact that should there be any admixture of the rubber present in the rubber cement with the cutback, there would be no adverse effect.

The invention is not restricted to any particular elastomer, i.e. rubber, organic solvent, or groups or combinations thereof. In forming a rubber cement from any of the elastomers and solvents mentioned below, from about 5% to about 40% of the elastomer is dissolved in from about 60% to about 95% of the organic solvent. For instance, the invention may employ natural rubber, copolymers of butadiene with other monomers (e.g. styrene), polybutadiene, homopolymers and copolymers of isoprene, butyl rubber (e.g. isobutylene-isoprene copolymers), polyisobutylene, polychloroprene rubbers, ethylene-α-olefin copolymers and terpolymers (e.g. ethylene-propylene rubber), nitrile rubber, etc. Although each of the above-mentioned elastomers may be employed to advantage in a rubber cement composition so as to form a vapor barrier, the use of butyl rubber as the elastomer is preferred. It is essential that the elastomer selected is not so soluble in the asphalt cutback that no film is formed, or so insoluble that a permanent layer develops. As the organic solvent for rubber cement, commercial solvents such as hexane, heptane, benzene or toluene are generally preferred, but any organic solvent for the particular elastomer to be dissolved may be used, including chloroform, carbon tetrachloride, ethers or the like. Hexane, is particularly preferred, as the solvent for the elastomer, e.g. butyl rubber.

The preferred rubber cement composition employed in the practice of this invention comprises butyl rubber dissolved in hexane. The percentages of butyl rubber and hexane that are present in the rubber cement may vary over a wide range. The butyl rubber cement composition may contain from about 5% to about 40% of butyl rubber and from about 60% to about 95% of hexane. It is preferred that the butyl rubber cement composition contain about 20% butyl rubber and about 80% hexane by weight.

The butyl rubber cement is added to the asphalt cutback in the storage tank in a conventional manner, e.g. pumping it into the tank. The butyl rubber cement forms a film on the surface of the asphalt cutback. The hexane in the butyl rubber cement gradually evaporates during the initial stages of storage, leaving a thin non-porous film comprised essentially of butyl rubber which floats upon the free surface of the asphalt cutback. As cutback asphalt is removed from, or added to, the storage tank, the non-porous butyl rubber film moves vertically in accordance with changes in the level of the free surface of the asphalt.

Various solvents are added to an asphalt to create an asphalt cutback. The types of solvents which are added to the asphalt depend in large part upon the type of asphalt cutback which is sought to be obtained. Normally, the solvent materials which are added are petroleum fractions of suitable boiling range. As examples rapid curing asphalt cutbacks are made by adding 140° F.–175° F. naphtha; medium curing asphalt cutbacks are made by adding a distillate having a boiling range of 350° F.–450° F. The preferred solvent for effecting a rapid curing asphalt cutback is an 140° F. I.B.P. (initial boiling point) naphtha.

The storage tank is normally heated by heating elements located on the inside of the tank. The heating elements may consist of pipes or coils, through which steam or heated oil is passed. Naturally, the heating of the contents of the tank increases the tendency of the added solvent, i.e. naphtha, to evaporate. The temperature to which the contents of the tank may be heated may vary from about 100° F. to about 200° F., but preferably the temperature is maintained between about 140° F. to about 180° F. Although it is optional, the contents of the tank may also be agitated during storage. When agitation is desired this is normally accomplished by pumping air into the bottom of the tank, which is then forced upwardly through the contents of the tank, causing a bubbling throughout the contents of the tank thus insuring agitation.

The weight of the butyl rubber cement employed is normally on the order of from about ½% to about 10% based on the weight of the asphalt cutback, i.e., asphalt plus added solvent. It is preferred to employ from about 1% to about 5%, by weight, of butyl rubber cement. Thus, it can be seen, that the amount of butyl rubber cement employed is relatively small. For example, if only a 1% by weight butyl rubber cement solution were added, consisting of 20% by weight of butyl rubber and 80% by weight of hexane, only 0.2%, by weight, of the total contents of the storage tank would be butyl rubber. The remainder of the contents of the tank would be 0.8% hexane and 99% of the asphalt cutback.

Although the discussion until this point has centered upon prevention of solvent loss from an asphalt cutback, this process can be applied with equal facility to other types of volatile materials, in particular, to other petroleum products. It could be applied to petroleum products which are stored with solvents, or to lower boiling petroleum fractions stored without any added solvents. Illustrative of petroleum products which may be employed in the practice of this invention are: petroleum naphtha, gasolene, fuel oil, etc. It could also be applied to other volatile materials such as: benzene, acetone, mineral oils, etc., provided that the small amounts of butyl rubber that are used form a film on the surface of the material in question.

In a further embodiment of this invention it has been found that beneficial results are obtained if the rubber cement is allowed to remain in the tank upon the withdrawal of the cutback from the bottom of the tank. When the tank is refilled with asphalt cutback, the existing rubber cement barrier still retains its effectiveness with respect to the newly added material.

In the following example is described a particular embodiment which illustrates this invention. However, it should be understood, that the invention is not intended to be limited to this specific embodiment.

EXAMPLE

Varying concentrations of butyl cement, as can be seen in Table 1 below, were added to an RC–2 asphalt cutback. The RC–2 cutback, which is a particular grade of rapid curing cutback, was formed by adding 140° F. I.B.P. naphtha to an asphalt. The butyl rubber cement employed consisted in each instance of a solution of a commercial butyl rubber in hexane. In each instance the butyl rubber cement composition consisted of 20% by weight of butyl rubber and 80% by weight of hexane. The percentage of butyl rubber cement employed in each sample is based on the weight of butyl rubber cement as compared with the total weight of the RC–2 cutback. Each of the samples was heated for a period of 72 hours, at a temperature of 150° F. in a rotating shelf laboratory oven, such as described in ASTM Method D6–39T, vol. II, 39th edition, ASTM Committee D–2 handbook. The samples, which were in conventional laboratory vessels, were weighed before and after heating for 72 hours. The percentage weight loss indicates the percent of the sample which was lost during the heating.

Table 1

| Sample | Percent wt. loss after 72 hrs. |
|---|---|
| (1) RC–2 (blank) | 16.6 |
| (2) RC–2+1% butyl rubber cement | 14.3 |
| (3) RC–2+2% butyl rubber cement | 11.9 |

From Table 1 it can be seen that a significant reduction in the percent weight loss of sample was obtained in accordance with the present invention when butyl rubber cement was added to the asphalt.

What is claimed is:

1. Method for inhibiting the vapor loss from the free surface of a volatile liquid contained in a storage tank which comprises covering said free surface of said volatile liquid with a floating film, said floating film comprising a solution of elastomer in an organic solvent.

2. Method for inhibiting the evaporation of volatile material from the free surface of petroleum products contained in a storage tank at elevated temperatures which comprises covering said free surface of said petroleum product with a floating film, said floating film comprising a solution of an elastomer in an organic solvent, said floating film moving vertically in said storage tank with changes in the level of said free surface of said petroleum product.

3. The method as recited in claim 2 in which said elastomer solution comprises from about 10% to about 40% by weight of butyl rubber in hexane.

4. Method for inhibiting the evaporation of a volatile solvent from the free surface of an asphalt cutback contained in a storage tank at elevated temperatures which comprises covering said asphalt cutback with a solution of an elastomer in an organic solvent, said elastomer forming a floating film upon evaporation of said organic solvent, said floating film moving vertically in said storage tank with changes in the level of said free surface of said asphalt cutback.

5. Method as recited in claim 4 in which said elastomer solution comprises from about 10% to about 40% by weight of butyl rubber in hexane.

6. Method as recited in claim 4 in which said elastomer solution comprises about 20% by weight of butyl rubber in hexane.

References Cited

UNITED STATES PATENTS

| 2,797,138 | 6/1957 | Veatch et al. | 21—60.5 |
| 2,797,140 | 6/1957 | Veatch | 21—60.5 |
| 3,146,060 | 8/1964 | Canevari | 21—60.5 |

OTHER REFERENCES

J. G. Devys, Chem. Eng. 71 (7), 87–90 (March 1964).

MORRIS O. WOLK, *Primary Examiner.*

S. MARANTZ, *Assistant Examiner.*